(12) United States Patent
Sanders et al.

(10) Patent No.: US 8,857,527 B2
(45) Date of Patent: Oct. 14, 2014

(54) COMPOSITIONS FOR OIL RECOVERY AND METHODS OF THEIR USE

(75) Inventors: Aaron W. Sanders, Missouri City, TX (US); Ed G. Rightor, Midland, MI (US); Keith P. Johnston, Austin, TX (US); Quoc Nguyen, Austin, TX (US); Stephanie Adkins, Austin, TX (US); Xi Chen, Austin, TX (US)

(73) Assignee: Dow Global Technologies LLC, Midland, MI (US)

( * ) Notice: Subject to any disclaimer, the term of this patent is extended or adjusted under 35 U.S.C. 154(b) by 853 days.

(21) Appl. No.: 12/998,384

(22) PCT Filed: Aug. 19, 2009

(86) PCT No.: PCT/US2009/004722
§ 371 (c)(1),
(2), (4) Date: Apr. 14, 2011

(87) PCT Pub. No.: WO2010/044818
PCT Pub. Date: Apr. 22, 2010

(65) Prior Publication Data
US 2011/0198101 A1    Aug. 18, 2011

Related U.S. Application Data

(60) Provisional application No. 61/196,235, filed on Oct. 15, 2008.

(51) Int. Cl.
E21B 43/00 (2006.01)
C08G 65/26 (2006.01)

(52) U.S. Cl.
CPC ................. C08G 65/2609 (2013.01)
USPC ........................ 166/402; 568/606

(58) Field of Classification Search
CPC ............. C11D 1/722; E21B 43/164
USPC ............ 106/402; 568/606; 166/402
See application file for complete search history.

(56) References Cited

U.S. PATENT DOCUMENTS

| | | | |
|---|---|---|---|
| 2,623,596 | A | 12/1952 | Whorton et al. |
| 2,866,507 | A | 12/1958 | Bond et al. |
| 3,065,790 | A | 11/1962 | Holm |
| 3,330,346 | A | 7/1967 | Jacobs et al. |
| 3,342,256 | A | 9/1967 | Bernard et al. |
| 3,529,668 | A | 9/1970 | Bernard |
| 4,113,011 | A | 9/1978 | Bernard et al. |
| 4,203,491 | A | 5/1980 | Reisberg |
| 4,293,428 | A | 10/1981 | Gale et al. |
| 4,380,266 | A | 4/1983 | Wellington |
| 4,502,538 | A | 3/1985 | Wellington et al. |
| 4,703,797 | A | 11/1987 | Djabbarah |
| 4,722,396 | A | 2/1988 | Balzer et al. |
| 4,739,831 | A | 4/1988 | Settlemeyer et al. |
| 4,784,798 | A | 11/1988 | Geke et al. |
| 4,828,029 | A | 5/1989 | Irani |
| 4,856,589 | A | 8/1989 | Kuhlman et al. |
| 4,860,828 | A | 8/1989 | Oswald et al. |
| 5,033,547 | A | 7/1991 | Schievelbein |
| 5,279,367 | A | 1/1994 | Osterloh |
| 5,333,687 | A | 8/1994 | Osterloh |
| 5,363,915 | A | 11/1994 | Marquis et al. |
| 5,705,476 | A * | 1/1998 | Hoffarth ............... 510/535 |

FOREIGN PATENT DOCUMENTS

| | | |
|---|---|---|
| DE | 3237608 | 4/1983 |
| EP | 0213554 | 3/1987 |
| EP | 0681865 | 11/1995 |
| GB | 2141731 | 1/1985 |

OTHER PUBLICATIONS

Dow, Technical Data Sheet, "TRITON X-100 Surfactant", The Dow Chemical Company, 1995, pp. 112, 212.
Sigma, Product Information Sheet, "Triton X-100", Apr. 21, 1999, 2 pages.
Miller, et al., "Solubility of CO2-philic oligomers; COSMOtherm predictions and experimental results", Fluid Phase Equilibria, 287 (2009), 26-32.
Mohamed, et al., "Hybrid CO2-philic Surfactants with Low Fluorine Content", Langmuir, No. 28, 2012, 6299-6306.
International Search Report and Written Opinion for related PCT application PCT/US2009/004722, dated May 3, 2010, 13 pages.
International Preliminary Report on Patentability from related PCT application PCT/US2009/004722, dated Dec. 17, 2010, 9 pages.
Dickson, et al., "Stabilization of Carbon Dioxide-in-Water Emulsions with Silica Nanoparticles", Langmuir, vol. 20, No. 19, American Chemical Society, 2004, pp. 7976-7983.
Zhu, et al., "Improving the Foam Performance for Mobility Control and Improved Sweep Efficiency in Gas Flooding", Ind. Eng. Chem. Res., vol. 43, No. 15, American Chemical Society, 2004, pp. 4413-4421.
Da Rocha, et el., "Concentrated CO2-in-Water Emulsions with Nonionic Polymeric Surfactants", Journal of Colloid and Interface Science, No. 239, 2001, pp. 241-253.
Liu, et al., "CO2 Foam Behavior: Influence of Temperature, Pressure, and Concentration of Surfactant", Society of Petroleum Engineers, No. 94307, 2005, pp. 1-13.
Syahputra, et al., "Laboratory Evaluation of Using Lignosulfonate and Surfactant Mixture in CO2 Flooding", Society of Petroleum Engineers, No. 59368, 2000, pp. 1-9.
Chou, et al., "CO2, Foam Field Trial at North Ward-Estes", Society of Petroleum Engineers, No. 24643, 1992, pp. 129-140.
Borchardt, et al., "Surfactants for CO2 Foam Flooding", Society of Petroleum Engineers, No. 14394, 1985, pp. 1-12.

* cited by examiner

*Primary Examiner* — Kuo-Liang Peng
(74) *Attorney, Agent, or Firm* — Brooks, Cameron & Huebsch, PLLC (57) ABSTRACT

Embodiments of the present disclosure include compositions for use in enhanced oil recovery, and methods of using the compositions for recovering oil. Compositions of the present disclosure include a nonionic, non-emulsifying surfactant having a $CO_2$-philicity in a range of about 1.5 to about 5.0, carbon dioxide in a liquid phase or supercritical phase, and water, where the nonionic, non-emulsifying surfactant promotes a formation of a stable foam formed of carbon dioxide and water.

9 Claims, 1 Drawing Sheet

COMPOSITIONS FOR OIL RECOVERY AND METHODS OF THEIR USE

This application is a National Stage application under 35 U.S.C. 371 of PCT/US2009/004722, and published as WO 2010/044818 on Apr. 22, 2010, which claims priority in part from U.S. Provisional Application Ser. No. 61/196,235 filed Oct. 15, 2008, the entire content of which is incorporated herein by reference.

This application claims priority to U.S. Provisional Application 61/196,235 filed Oct. 15, 2008, the specification of which is incorporated herein by reference.

FIELD OF DISCLOSURE

Embodiments of the present disclosure are directed toward oil recovery; more specifically, embodiments are directed toward compositions for oil recovery and methods of using the compositions in oil recovery processes.

BACKGROUND

A variety of techniques have been used to enhance the recovery of hydrocarbons from subterranean reservoirs in which the hydrocarbons no longer flow by natural forces. Such techniques can include water injection and/or subsequent gas flooding, among others. Water injection can be useful to recover some hydrocarbons, however, only about a third of the hydrocarbons are recovered using this technique. As such, typically water injection procedures are followed by gas flooding procedures. Gas flooding can be performed with a miscible gas, to reduce the viscosity of oil present in the reservoir formation in order to increase the flow of hydrocarbons to a production well. Carbon dioxide, which acts as a solvent to reduce the viscosity of the oil, is one of the most effective, and least expensive, miscible gases.

Gas flooding, however, can be accompanied with a number of drawbacks. One main problem encountered is poor sweep of the reservoir formation. Poor sweep occurs when the gas injected into the reservoir during a gas flooding process flows through the paths of least resistance due to the low viscosity of the gas, thus bypassing significant portions of the formation. When the gas bypasses significant portions of the formation, less oil is contacted with the gas, reducing the likelihood that the gas will reduce the viscosity of the oil. Thus, the gas injected during the gas flooding process is meant to "sweep" the oil toward the production well by lowering the viscosity of the oil. However, when the gas does not contact a large portion of the oil contained in the reservoir formation, a large portion of the oil in the reservoir formation is left behind, producing poor sweep. In addition, due to the low density of the gas, the injected gas can rise to the top of the formation and "override" portions of the formation, leading to early breakthrough of the gas at the production well, leaving less gas within the reservoir formation to contact with the oil, again reducing the likelihood that the gas will reduce the viscosity of oil.

To enhance the gas flooding process effectiveness, it has been suggested that the overall efficiency of a gas flooding process can be improved by including a foaming agent or surfactant to generate a foam in the formation. A foam can generate an apparent viscosity of about 100 to about 1,000 times that of the injected gas, therefore, the foam can inhibit the flow of the gas into that portion of the reservoir formation that has previously been swept. In other words, the foam can serve to block the volumes of the reservoir formation through which the gas can short-cut, thereby reducing its tendency to channel through highly permeable fissures, cracks, or strata, and directing it toward previously unswept portions of the reservoir formation. As such, the foam can force the gas to drive the recoverable hydrocarbons from the less depleted portions of the reservoir toward the production well.

The surfactants used in gas flooding processes, however, have suffered from a number of drawbacks. For example, traditional surfactants, such as ethoxy-sulfates, tend to create unstable foams in the reservoir formation. An unstable foam can break and/or dissolve in the reservoir formation, allowing the gas from the gas flooding process to flow into the paths of least resistance, leading to early breakthrough and poor sweep, as discussed herein.

Another problem encountered by prior art surfactants has been the selection of anionic surfactants that have a high affinity to formation rock within the reservoir, for example, carbonate. Surfactants with a high affinity to formation rock can adsorb into the formation rock, leading to surfactant loss. Without the surfactant present, there is less likelihood of forming foam within the reservoir, also leading to early breakthrough and poor sweep, as discussed herein.

Although nonionic surfactants have been used in the prior art to resolve the adsorption problem, the nonionic surfactants chosen have been good emulsifiers of water and oil. As appreciated by one skilled in the art, water flooding is performed prior to the gas flooding process. As such, the reservoir formation is often filled with water when the gas flooding process begins. In addition, since water and oil are present in the reservoir formation, it follows that a mixture of water and oil exit the reservoir formation through a production well. Since water and oil are present in the reservoir formation, a surfactant that creates an emulsion of the oil and water exiting the reservoir formation is undesirable since the oil and water must then be separated to recover the oil, leading to increased production costs.

SUMMARY

Embodiments of the present disclosure include compositions for use in enhanced oil recovery, and methods of using the compositions for recovering oil. The compositions of the present disclosure can include a nonionic, non-emulsifying surfactant, where the surfactant promotes a formation of a stable foam formed of carbon dioxide and water.

For the various embodiments, the nonionic, non-emulsifying surfactant has the formula RO—$(CR^1R^2CR^3R^4O)_x$—$(C_2H_4O)_y$—H for use in forming a stable foam with carbon dioxide and water, where R is selected from the group of branched alkyl, cyclic alkyl, and alkaryl groups having 3 to 11 carbon atoms; $R^1$, $R^2$, $R^3$, and $R^4$ are each independently selected from the group of H, branched alkyl, linear alkyl, cyclic alkyl, or alkaryl groups having 1 to 6 carbon atoms; with the proviso that one or more of the following apply: that $R^1$, $R^2$, $R^3$, and $R^4$ cannot all be H, the sum of carbon atoms in $R^1+R^2+R^3+R^4$ is less than or equal to about 8; x is from 1.5 to 11 inclusive when the sum of carbon atoms in $R^1+R^2+R^3+R^4$ is equal to 1; x is an integer from 1 to 2 inclusive when the sum of carbon atoms in $R^1+R^2+R^3+R^4$ is equal to 2 to 8; and y is an integer from 6 to 25 inclusive. For the various embodiments, the nonionic, non-emulsifying surfactant can have a $CO_2$-philicity in a range of about 1.5 to about 5.0. In specific embodiments the nonionic, non-emulsifying surfactant is selected from the group including $(C_8H_{17}O)$—$(C_3H_6O)_5$—$(C_2H_4O)_9$—H, $(C_8H_{17}O)$—$(C_3H_6O)_5$—$(C_2H_4O)_{11}$—H, $(C_8H_{17}O)$—$(C_3H_6O)_9$—$(C_2H_4O)_9$—H, $(C_6H_{13}O)$—

$(C_3H_6O)_5$—$(C_2H_4O)_{11}$—H, $(C_6H_{13}O)$—$(C_3H_6O)_5$—$(C_2H_4O)_{13}$—H, $(C_9H_{19}O)$—$(C_3H_6O)_4$—$(C_2H_4O)_8$—H, and mixtures thereof.

For the various embodiments, the present disclosure also includes a method for recovering oil from a reservoir formation that is penetrated by at least one injection well and one production well, where the method includes selecting a non-ionic, non-emulsifying surfactant having a $CO_2$-philicity in a range of about 1.5 to about 5.0; forming a stable foam of carbon dioxide and water in the reservoir formation with the nonionic, non-emulsifying surfactant; allowing the carbon dioxide in the stable foam to dissolve into the oil in the reservoir formation to provide a lowered viscosity of the oil; and pumping the oil having the lowered viscosity from the reservoir formation. For the various embodiments, the surfactant can include embodiments as described above. For the various embodiments, the surfactant can also have a formula RO—$(CR^1R^2CR^3R^4O)_x(C_2H_4O)_y$—H, where R is a linear alkyl group having 3 to 6 carbon atoms; $R^1$, $R^2$, $R^3$, and $R^4$ are each independently selected from the group of H, branched alkyl, linear alkyl, cyclic alkyl, or alkaryl groups having 1 to 6 carbon atoms; with the proviso that one or more of the following apply: that $R^1$, $R^2$, $R^3$, and $R^4$ cannot all be H, the sum of carbon atoms in $R^1+R^2+R^3+R^4$ is less than or equal to about 8; x is from 4 to 11 inclusive when the sum of carbon atoms in $R^1+R^2+R^3+R^4$ is equal to 1; (e.g., the alkylene oxide group is propylene oxide) x is an integer from 1 to 2 inclusive when the sum of carbon atoms in $R^1+R^2+R^3+R^4$ is equal to 2 to 8 (e.g., the alkylene oxide group is butylene oxide or isobutylene oxide); and y is an integer from 6 to 25 inclusive.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Definitions

As used herein, "a," "an," "the," "at least one," and "one or more" are used interchangeably. The terms "comprises," "includes" and variations of these words do not have a limiting meaning where these terms appear in the description and claims. Thus, for example, a composition that comprises "a" nonionic, non-emulsifying surfactant can be interpreted to mean a compositions that includes "one or more" nonionic, non-emulsifying surfactants. In addition, the term "comprising," which is synonymous with "including" or "containing," is inclusive, open-ended, and does not exclude additional unrecited elements or method steps.

As used herein, the term "and/or" means one, more than one, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "water" can include, for example, a brine, a connate water, surface water, distilled water, carbonated water, sea water and a combination thereof. For brevity, the word "water" will be used herein, where it is understood that one or more of "brine," "connate water," "surface water," "distilled water," "carbonated water," and/or "sea water" can be used interchangeably.

As used herein, a "surfactant" refers to a chemical compound that lowers the interfacial tension between two liquids.

As used herein, an "emulsion" refers to a mixture of two immiscible substances, where one substance (the dispersed phase) is dispersed in the other (the continuous phase).

As used herein, a "nonionic surfactant" refers to a surfactant where the molecules forming the surfactant are uncharged.

As used herein, the term "non-emulsifying" refers to a surfactant that does not substantially encourage the formation of emulsions that can form in reservoir formations between oil and water.

As used herein, an emulsion that "breaks" refers to an emulsion of two liquids (e.g., oil and water) that substantially separate into two phases, measured visually, in a set amount of time.

As used herein, the term "organic group" is used for the purpose of this disclosure to mean a hydrocarbon group that is classified as an aliphatic group, cyclic group, or a combination of aliphatic and cyclic groups (e.g., alkaryl and aralkyl groups).

In the context of the present disclosure, the term "aliphatic group" means a saturated or unsaturated linear or branched hydrocarbon group. This term is used to encompass a saturated linear or branched monovalent hydrocarbon group including, for example, alkyl groups having the general formula $C_nH_{2n}$ or $C_nH_{2n+1}$, depending upon its location in a compound, unsaturated, linear or branched monovalent hydrocarbon groups with one or more olefinically unsaturated groups (i.e., carbon-carbon double bonds); and unsaturated, linear or branched monovalent hydrocarbon groups with one or more carbon-carbon triple bonds.

The term "cyclic group" means a closed ring hydrocarbon group that is classified as an alicyclic group, aromatic group, or heterocyclic group.

The term "alicyclic group" means a cyclic hydrocarbon group having properties resembling those of aliphatic groups.

The term "aromatic group" or "aryl group" means a mono- or polynuclear aromatic hydrocarbon group.

The term "heterocyclic group" means a closed ring hydrocarbon in which one or more of the atoms in the ring is an element other than carbon (e.g., nitrogen, oxygen, sulfur, etc.).

As used herein, the term "branched alkyl" means a monovalent hydrocarbon group having a branched chain arrangement of the constituent carbon atoms, where such a structure can be saturated or unsaturated.

As used herein, the term "supercritical phase" means a dense gas that is maintained above its critical temperature (the temperature above which it cannot be liquefied by pressure).

DETAILED DESCRIPTION

Embodiments of the present disclosure include compositions for use in enhanced oil recovery, and methods of using the compositions for recovering oil. The compositions of the present disclosure can include a nonionic, non-emulsifying surfactant, where the surfactant promotes a formation of a stable foam formed of carbon dioxide and water.

Surfactants are usually organic compounds that are amphiphilic, meaning they contain both hydrophobic groups and hydrophilic groups, therefore they can be soluble in both organic solvents and water. In embodiments herein, the surfactant can lower the interfacial tension between carbon dioxide and water.

As appreciated by one skilled in the art, carbon dioxide is in a liquid phase when subjected to a pressure of about 1,000 pounds per square inch (psi) and a temperature below about 31 degrees Celsius (° C.). In addition, the carbon dioxide can transition to a supercritical phase when, at a pressure of about 1,000 psi, the temperature rises above 31° C. In embodiments of the present disclosure, the carbon dioxide injected into the reservoir formation can be transferred through a pipeline where the pressure is about 2,000 psi and temperature ranges from about 25 to about 70° C. As such, the carbon dioxide can vacillate between a supercritical phase and a liquid phase, however, for embodiments of the present disclosure the carbon dioxide is described as behaving as a liquid.

When the nonionic, non-emulsifying surfactant of the present disclosure is injected with the carbon dioxide and water into the reservoir formation containing hydrocarbons (e.g., oil), the nonionic, non-emulsifying surfactant can promote the formation of an emulsion, or foam, formed of carbon dioxide and water. As used herein, and as known to those skilled in the art, although the carbon dioxide and water are in a liquid and/or a supercritical phase in the reservoir formation and form an appropriately named "emulsion," to prevent confusion with other emulsions that can form as discussed herein, the emulsion formed of carbon dioxide and water using the nonionic, non-emulsifying surfactant will be referred to herein as a "foam."

As indicated, the surfactant of the present disclosure can be nonionic. As such, the hydrophilic group included in the surfactant is made up of a water soluble constituent (e.g., a short, water-soluble constituent) rather than a charged species. For example, such hydrophilic groups can include, but are not limited to, a poly(ethylene oxide) constituent, since poly(ethylene oxide) is a water soluble polymer, and is nonionic, as is discussed herein.

In some instances, reservoir formation rock can have a charge. For example, a reservoir formation formed of carbonate rock can have a positive charge. In such formations, the use of an anionic surfactant can prove detrimental since anionic surfactants can be attracted to the positive charge of the rock, and thus be subject to high adsorption losses to the formation rock (i.e., greater than about 0.5 mg/g of rock). The loss of surfactant due to adsorption can be undesirable from an economic and a practical point of view. For example, surfactants generally are relatively expensive as compared to carbon dioxide used in a gas flooding process. Loss of surfactant, therefore, can lead to higher production costs, making the recovery of oil more expensive and less profitable. In embodiments of the present disclosure, the surfactant is nonionic, therefore the surfactant is not likely to be attracted to a positive or a negative charge associated with the reservoir formation rock. As such, the use of a nonionic surfactant can substantially prevent surfactant adsorption onto reservoir formation rock.

As appreciated by one skilled in the art, emulsions formed of oil and water in an oil recovery process are undesirable from a production standpoint since any emulsion formed of water and oil must be broken in order to recover the oil. In addition, emulsions formed of oil and water formed in oil recovery processes that are difficult to break can be undesirable since the emulsions of oil and water can lead to formation plugging and/or processing difficulties when the oil is sought to be extracted from the water in an oil recovery process. As such, while it is most desirable to prevent all emulsions of water and oil from occurring, it is highly improbable to avoid such emulsions since water and oil exit the reservoir formation together and become mixed in the production well pipe as the oil and water flow to the surface, forming the emulsions of water and oil.

In embodiments of the present disclosure, the surfactant included in compositions of the present disclosure is also a non-emulsifying surfactant. As discussed herein, a surfactant refers to a chemical compound that lowers the interfacial tension between two liquids. Surfactants of the present disclosure, however, lower the interfacial tension between carbon dioxide and water to create foam formed of carbon dioxide and water. As such, although the formation of emulsions of oil and water cannot be entirely prevented, the non-emulsifying surfactants of the present disclosure do not encourage the formation of such emulsions, nor substantially stabilize such emulsions.

The nonionic, non-emulsifying surfactants of the present disclosure, therefore, can generally be present in a "breakable" emulsion of oil and water. In one embodiment, when the nonionic, non-emulsifying surfactant is present in a mixture of oil and water, an emulsion of water and oil that may form can break in about 2 hours or less. In an additional embodiment, an emulsion of water and oil that may form can break in about 1.5 hours or less. In another embodiment, an emulsion of water and oil that may form can break in about 1 hour or less.

In some embodiments, the nonionic, non-emulsifying surfactant of the present disclosure can be determined to be non-emulsifying by mixing the surfactant, oil (e.g., decane), and water to form an emulsion and measuring the time required for the emulsion to break. In embodiments of the present disclosure, the amount of nonionic, non-emulsifying surfactant can be kept to a low level to replicate the amount of surfactant present in the water in a reservoir formation. For example, the amount of the nonionic, non-emulsifying surfactant mixed with oil and water can range from about 0.005 to about 0.01 weight percent, based on a total weight of the composition. As appreciated by one of skilled in the art, using a larger amount of surfactant can affect the amount of emulsion formed and how long the emulsion takes to separate into two phases. In the examples herein, as discussed further in the Example Section, the amount of the nonionic, non-emulsifying surfactant is kept to a low level in order to see the difference between the surfactants examined in a reasonable amount of time.

In addition, the nonionic, non-emulsifying surfactant can be included in compositions of the present disclosure in order to create a stable foam formed of carbon dioxide and water. As used herein, a "stable foam" formed of carbon dioxide and water refers to a foam that remains as a foam (e.g., does not break down or dissolve) for a duration sufficient for its intended purpose in enhanced oil recovery.

For the various embodiments, nonionic, non-emulsifying surfactants of the present disclosure that can be used to create a stable foam can be identified by their $CO_2$-philicity. The "$CO_2$-philicity" has been found to be based on the dominant factors of the hydrophobic-hydrophobic interactions of the tails of the surfactants as well as the hydrophobic-carbon dioxide interactions of the surfactant tails in the carbon dioxide. Therefore, the $CO_2$-philicity refers to a value that can be determined and assigned to a compound, e.g., a surfactant, which references how well the compound is solvated in the carbon dioxide phase.

The $CO_2$-philicity of a surfactant, as used herein, is defined as the negative difference of a first chemical potential of the surfactant's hydrophobic end in carbon dioxide ($\mu CT$) and a second chemical potential of the surfactant's hydrophobic end in its liquid form ($\mu TT$), shown below.

$$CO_2\text{-philicity} = -(\mu CT - \mu TT)$$

The chemical potential of a substance in a solvent or solvent mixture defines its stability in that solvent or solvent mixture, and is a measure of how much free enthalpy (or energy) of a system changes when a number of molecules of one species is added or removed while keeping the number of the other molecules, along with the temperature and pressure, constant. Thus, the first chemical potential ($\mu CT$) describes the interaction of the surfactant's hydrophobic tail with carbon dioxide and the second chemical potential ($\mu TT$) describes the interaction of the surfactant's hydrophobic tail with another of the surfactant's hydrophobic tail in the liquid form of the surfactant.

For the various embodiments, models developed as a part of the present disclosure are used to calculate the chemical potentials $\mu CT$ and $\mu TT$. In embodiments of the present disclosure, software packages, such as COSMOtherm (COSMOlogic, GmbH&CoKG), can be used to implement the models of the present disclosure, where the results can be used in parallel to determine the chemical potentials.

For example, to determine the second chemical potential of the surfactant's hydrophobic tail with itself, a first model is created to represent the structure of the surfactant's hydrophobic tail. Next, a second model is created to take the structure of the surfactant's hydrophobic tail from the first model and repeat the structure from the first model over and over until a continuum of the structure is created. From this, a "liquid" of the surfactant structure is created in the second model. A third model is then created to take the structure of the surfactant's hydrophobic tail from the first model and insert it into the "liquid," or continuum, from the second model, and the amount of energy that it takes to then remove the structure of the surfactant's hydrophobic tail (the first model) from the liquid (the second model) represents the second chemical potential ($\mu TT$) of the surfactant's hydrophobic tail with itself.

The three models can then be varied depending on what chemical potential is to be determined. For example, to calculate the first chemical potential of the surfactant's hydrophobic tail with carbon dioxide, the first model is created to represent the structure of the surfactant's hydrophobic tail. Next, a second model is created to represent a continuum of a structure of carbon dioxide. A third model is then created to take the structure of the surfactant's hydrophobic tail from the first model and insert it into the "liquid," or continuum, from the second model, and the amount of energy that it takes to then remove the structure of the surfactant's hydrophobic tail (the first model) from the liquid (the second model) represents the first chemical potential ($\mu CT$) of the surfactant's hydrophobic tail with carbon dioxide.

Although the $CO_2$-philicity can be determined for each surfactant as a first step in identifying surfactants of interest, in order to verify that the surfactant will form a stable foam formed of carbon dioxide and water, the surfactants are screened for use in oil recovery in a screening method. The screening method includes passing the composition of a nonionic, non-emulsifying surfactant, carbon dioxide, and water through a layer of sand at about 4 milliliters per minute (ml/min), at a temperature and pressure that is representative of a reservoir formation in which the nonionic, non-emulsifying surfactant is to be used in order to create a foam of carbon dioxide and water. In one embodiment, such a representative temperature can be 40° C., and a representative pressure can be about 2,000 pounds per square inch (psi). A more detailed description of the screening method is described in the Examples Section herein.

In some embodiments, the amount of carbon dioxide, water, and nonionic, non-emulsifying surfactant of the composition passed through the layer of sand can be about 90 volume percent carbon dioxide, about 10 volume percent water, and about 0.1 weight percent nonionic, non-emulsifying surfactant, based on a total weight of the composition. In addition, the testing conditions (e.g., 4 ml/min at 40° C. and 2,000 psi) can be chosen because they are representative of conditions in the reservoir formation. However, embodiments of the present disclosure also include the screening method using other testing conditions that would be representative of other reservoir formation conditions and/or for nonionic, non-emulsifying surfactants with a cloud point below 40 degrees Celsius, as is discussed herein.

By developing and performing the screening method on a variety of surfactants, as described herein, nonionic, non-emulsifying surfactants with the ability to form stable foams can be determined. In addition, since the $CO_2$-philicity can be ascribed to each surfactant, as discussed herein, a $CO_2$-philicity range that describes those surfactants that form a stable foam can also be determined.

Based on the discussion provided herein, embodiments of the present disclosure can include nonionic, non-emulsifying surfactants with a lower limit for the $CO_2$-philicity of at least about 1.5. In an additional embodiment, the present disclosure can include nonionic, non-emulsifying surfactants with a lower limit for the $CO_2$-philicity of at least about 1.6. In another embodiment, the present disclosure can include nonionic, non-emulsifying surfactants with a lower limit for the $CO_2$-philicity of at least about 1.7. In some embodiments, the $CO_2$-philicity of the nonionic, non-emulsifying surfactants can have an upper limit of no greater than about 5.0. In an additional embodiment, the present disclosure can include nonionic, non-emulsifying surfactants with an upper limit for the $CO_2$-philicity of no greater than about 4.5. In another embodiment, the present disclosure can include nonionic, non-emulsifying surfactants with an upper limit of no greater than about 4.0. Embodiments of the present disclosure also include nonionic, non-emulsifying surfactants with a $CO_2$-philicty that has a range that includes at least one of the upper limit values and at least one of the lower limit values provided herein with regard to $CO_2$-philicty values. So, for example, nonionic, non-emulsifying surfactants of the present disclosure can have a $CO_2$-philicty that has a range of about 1.5 to about 5.0.

With respect to the recited upper and lower limits, it has been discovered that a surfactant with a $CO_2$-philicity greater than about 5.0 can be too $CO_2$-philic, meaning the surfactant will have a strong attraction to carbon dioxide. Thus, for embodiments of the present disclosure, the surfactant is less likely to interact with water, making it undesirable for oil recovery applications. Similarly, a surfactant with a $CO_2$-philcity less than 1.5 can be not $CO_2$-philic enough, meaning the surfactant is less likely to dissolve in carbon dioxide, therefore the water and carbon dioxide will be less likely to mix together to form a stable foam.

The screening method, as described herein, can also be used to identify structural constituents in the nonionic, non-emulsifying surfactants that are able to contribute to forming a stable foam. For example, structural constituents of nonionic, non-emulsifying surfactants forming a stable foam formed of carbon dioxide and water can include a hydrophobic constituent, a hydrophilic constituent and a linking group that joins the hydrophobic constituent and the hydrophilic constituent. For the various embodiments, the hydrophilic constituent of the nonionic, non-emulsifying surfactant can be an ethylene oxide constituent having the general formula —$(C_2H_4O)_y$—. For the embodiments, the ethylene oxide constituent may be referred to as "EO."

For the various embodiments, the hydrophobic constituent of the nonionic, non-emulsifying surfactant can have the general formula RO—, where R can be selected from the group of linear alkyl, branched alkyl, cyclic alkyl, and alkaryl groups as discussed herein. For the various embodiments, the branched alkyl, cyclic alkyl, and alkaryl groups for R of the hydrophobic constituent contain from 3 to 11 carbon atoms, whereas the linear alkyl group contains from 3 to 6 carbon atoms. When the R group of the hydrophobic constituent contains more than 11 carbon atoms, large tail-tail interactions can result, which decreases the $CO_2$-philicity of the surfactant. However, when the R group of the hydrophobic constituent contains less than 3 carbon atoms the tail-tail interactions are decreased and the $CO_2$-philicity of the surfactant increases.

For the various embodiments, the linking group that joins the hydrophobic constituent and the hydrophilic constituent can have the general formula —$(CR^1R^2CR^3R^4O)_x$—, where $R^1$, $R^2$, $R^3$, and $R^4$ are each independently selected from the group of H, branched alkyl, linear alkyl, cyclic alkyl and alkaryl groups having 1 to 6 carbon atoms, with the proviso that one or more of the following apply: that $R^1$, $R^2$, $R^3$, and $R^4$ cannot all be H and the total number of carbon atoms in $R^1+R^2+R^3+R^4$ is less than or equal to about 8. Examples of such linking groups can include, but are not limited to, alkylene oxides, such as propylene oxide (referred to herein as "PO"), butylene oxide, styrene oxide, isobutylene oxide, hexene oxide, octene oxide, and cyclohexene oxide which can increase carbon dioxide solubility, and thus increase the $CO_2$-philicity of the surfactant.

In some embodiments, the nonionic, non-emulsifying surfactant of the present disclosure can have a formula as follows:

where
R is selected from the group of branched alkyl, cyclic alkyl, and alkaryl groups having 3 to 11 carbon atoms;
$R^1$, $R^2$, $R^3$, and $R^4$ are each independently selected from the group of H, branched alkyl, linear alkyl, cyclic alkyl, or alkaryl groups having 1 to 6 carbon atoms; with the proviso that one or more of the following apply: that $R^1$, $R^2$, $R^3$, and $R^4$ cannot all be H, the sum of carbon atoms in $R^1+R^2+R^3+R^4$ is less than or equal to about 8;
x is from 1.5 to 11 inclusive when the sum of carbon atoms in $R^1+R^2+R^3+R^4$ is equal to 1; (e.g., the alkylene oxide group is propylene oxide)
x is an integer from 1 to 2 inclusive when the sum of carbon atoms in $R^1+R^2+R^3+R^4$ is equal to 2 to 8 (e.g., the alkylene oxide group is butylene oxide or isobutylene oxide); and
y is an integer from 6 to 25 inclusive.

In additional embodiments, the nonionic, non-emulsifying surfactant of the present disclosure can have a formula as follows:

where
R is a linear alkyl group having 3 to 6 carbon atoms;
$R^1$, $R^2$, $R^3$, K and $R^4$ are each independently selected from the group of H, branched alkyl, linear alkyl, cyclic alkyl, or alkaryl groups having 1 to 6 carbon atoms; with the proviso that one or more of the following apply: that $R^1$, $R^2$, $R^3$, and $R^4$ cannot all be H, the sum of carbon atoms in $R^1+R^2+R^3+R^4$ is less than or equal to about 8;
x is from 4 to 11 inclusive when the sum of carbon atoms in $R^1+R^2+R^3+R^4$ is equal to 1; (e.g., the alkylene oxide group is propylene oxide)
x is an integer from 1 to 2 inclusive when the sum of carbon atoms in $R^1+R^2+R^3+R^4$ is equal to 2 to 8 (e.g., the alkylene oxide group is butylene oxide or isobutylene oxide); and
y is an integer from 6 to 25 inclusive.

For the various embodiments, specific examples of the nonionic, non-emulsifying surfactants of the present disclosure can be selected from a group including, but not limited to, $(C_8H_{17}O)$—$(C_3H_6O)_5$—$(C_2H_4O)_9$—H, $(C_8H_{17}O)$—$(C_3H_6O)_5$—$(C_2H_4O)_{11}$—H, $(C_8H_{17}O)$—$(C_3H_6O)_9$—$(C_2H_4O)_9$—H, $(C_6H_{13}O)$—$(C_3H_6O)_5$—$(C_2H_4O)_{11}$—H, $(C_6H_{13}O)$—$(C_3H_6O)_5$—$(C_2H_4O)_{13}$—H, $(C_9H_{19}O)$—$(C_3H_6O)_4$—$(C_2H_4O)_8$—H, and mixtures thereof. For these specific examples, the R group, as provided herein, can be one of a linear alkyl or branched alkyl as is possible for the given formula. For the various embodiments, each of these specific examples of the nonionic, non-emulsifying surfactants include EO and PO groups, as discussed herein, where the $CO_2$-philicity is in the range of about 1.5 to about 5.0, from about 1.6 to about 4.5, or from about 1.7 to about 4.0, where a $CO_2$-philicity in these ranges would be useful for promoting the formation of a stable foam of carbon dioxide and water.

For the various embodiments, the compounds used to form the hydrophilic constituent and the linking group of the surfactant can be block fed during the surfactants synthesis. In an additional embodiment, each of the hydrophilic constituent and the linking group can be formed from one or more compounds. When more than one compound is used to form the hydrophilic constituent and/or the linking group, these compounds may be co-fed to the reaction at different ratios. For example, the ratio of the co-fed reactants to form the hydrophilic constituent and/or the linking group can be greater than 80 percent by weight of a first compound, with the remainder being at least a second compound. In additional embodiment, the ratio of the co-fed reactants to form the hydrophilic constituent and/or the linking group can be greater than 90 percent by weight of a first compound, with the remainder being at least a second compound. In a further embodiment, the ratio of the co-fed reactants to form the hydrophilic constituent and/or the linking group can be greater than 95 percent by weight of a first compound, with the remainder being at least a second compound. In another embodiment, the ratio of the co-fed reactants to form the hydrophilic constituent and/or the linking group can be greater than 98 percent by weight of a first compound, with the remainder being at least a second compound. So, for example, a feed of 90 percent by weight of propylene oxide and 10 percent by weight of ethylene oxide could be randomly alkoxylated and still be considered a propylene oxide (PO) linking group for the surfactant.

It is further appreciated that each R, $R^1$, $R^2$, $R^3$, and $R^4$ group need not be equivalent within the surfactant, and that the surfactants of the present disclosure can include different combinations of R, $R^1$, $R^2$, $R^3$, and $R^4$ groups within a surfactant, so long as they meet the structural requirements discussed herein. So, for example, linking group, —$(CR^1R^2CR^3R^4O)_x$—, can have different structural R, $R^1$, $R^2$, $R^3$, and $R^4$ organic groups in the surfactant.

For the various embodiments, the nonionic, non-emulsifying surfactant, as described herein, can be included in an amount of at least 0.01 weight percent when dissolved directly in the carbon dioxide phase, based on a total weight of the composition. In an additional embodiment, the nonionic, non-emulsifying surfactant of the present disclosure can be present in an amount of at least 0.05 weight percent when dissolved directly in the carbon dioxide phase, based on a total weight of the composition. In another embodiment, the nonionic, non-emulsifying surfactant can be present in an amount of at least about 0.5 weight percent when dissolved in the water phase. In an additional embodiment, the nonionic, non-emulsifying surfactant can be present in an amount of at least about 1.0 weight percent when dissolved in the water phase.

In addition, the nonionic, non-emulsifying surfactant can be included in the compositions of the present disclosure in a range of about 0.03 to about 5.0 weight percent based on the total weight of the composition. In another embodiment, the nonionic, non-emulsifying surfactant can be included in the compositions of the present disclosure in a range of about 0.05 to about 2.0 weight percent based on the total weight of the composition. Other ranges are possible.

As discussed herein, the screening method can be used to determine whether the foam formed of the nonionic, non-emulsifying surfactant, carbon dioxide and water is a stable foam. In addition, the screening method can be used to determine whether the foam formed of the nonionic, non-emulsifying surfactant, carbon dioxide and water will be beneficial in an enhanced oil recovery process. Since the purpose of forming the foam of the nonionic, non-emulsifying surfactant, carbon dioxide and water is to channel carbon dioxide into previously unswept portions of the reservoir formation, as discussed herein, to do so the foam formed of carbon dioxide and water has an apparent viscosity of at least 50 centipoise (cps) and at most 300 cps at the temperature representative of the field in which it will be used.

Viscosity is used to describe a fluid's resistance to flow: more specifically, viscosity is the ratio of the shearing stress to the velocity gradient in a fluid. For the stable foam formed of the nonionic, non-emulsifying surfactant, carbon dioxide and water an apparent viscosity is used to better describe the foam's resistance to flow in embodiments herein. By having an apparent viscosity of at least 50 cps at the temperature representative of the field in which it will be used, the foam formed of the nonionic, non-emulsifying surfactant, carbon dioxide and water can slow down the flow of carbon dioxide into the reservoir formation while also blocking portions of the reservoir formation that have been previously depleted using other recovery techniques.

The apparent viscosity of the foams formed of the nonionic, non-emulsifying surfactant, carbon dioxide and water of the present disclosure can be determined using the equation:

$$\eta_{apparent} = \frac{\tau}{\dot{\gamma}} = \frac{\left(\frac{\Delta P \cdot R}{L}\right)}{\left(\frac{U}{R}\right)} \lambda = \frac{\lambda R^2 \Delta P}{LU}$$

where the factoring term, $\lambda$, is set to 0.5 and R describes a radius of a capillary tube used in an apparatus for measuring the apparent viscosity, $\Delta P$ is a measured pressure drop across the capillary tube, L is a length of the capillary tube, and U is the velocity of the foam emerging from the capillary tube. The apparatus used in the screening process, as well as the apparent viscosity are described in more detail in the Example Section herein.

In addition, nonionic, non-emulsifying surfactants of the present disclosure have a cloud point. The cloud point of nonionic, non-emulsifying surfactants is defined as the temperature at which the surfactant becomes insoluble in water at a given surfactant concentration and a salinity of the water. For the nonionic, non-emulsifying surfactants, the water solubility of the surfactant is governed by the ability of water to hydrate the hydrophilic group of the nonionic, non-emulsifying surfactant, for example, the poly(ethylene oxide) constituent group on the surfactant of the present disclosure. The cloud point also increases as the length of the poly(ethylene oxide) constituent is increased, whereas the cloud point generally decreases as the salinity of the water increases.

For embodiments of the present disclosure, the nonionic, non-emulsifying surfactants can be utilized in a reservoir formation where the temperature of the reservoir formation is below the cloud point of the nonionic, non-emulsifying surfactant. Once the temperature of the reservoir formation approaches the cloud point of the nonionic, non-emulsifying surfactant, the emulsion formed of water and carbon dioxide can become unstable since the nonionic, non-emulsifying surfactant is no longer soluble in water at a temperature above the cloud point, and thus cannot encourage the formation of a foam formed of water and carbon dioxide.

From this, it would appear that increasing the cloud point of the nonionic, non-emulsifying surfactant would be desirable since having a high surfactant cloud point would allow the nonionic, non-emulsifying surfactant to be utilized in reservoir formations with higher temperatures. However, increasing the cloud point of a surfactant, for example, by increasing the length of the poly(ethylene oxide) constituent, also increases the surfactant's hydrophilic-lipophilic balance (HLB). The HLB measures how balanced a surfactant is at an oil-water interface. For the various embodiments, the HLB can be a useful value for determining a surfactant's ability to lower the interfacial tension between oil and water, thus forming an oil-water emulsion. For the present embodiments, surfactants with an HLB of about 14 to about 20 will generally be good emulsion stabilizing surfactants of oil and water. Since the emulsification of oil and water is generally sought to be prevented, the increase of the HLB must be balanced with the temperature specifications of each reservoir formation.

In some embodiments, the composition for use in enhanced oil recovery including the nonionic, non-emulsifying surfactants of the present disclosure can be used in a reservoir formation where a temperature of the reservoir formation has a range of about the cloud point of the nonionic, non-emulsifying surfactant to about 30° C. below the cloud point of the nonionic, non-emulsifying surfactant. In some embodiments, the temperature of the reservoir formation can be in a range of about 10 to about 20° C. below the cloud point of the nonionic, non-emulsifying surfactant.

As such, in embodiments where the reservoir formation temperature is increased, a nonionic, non-emulsifying surfactant with an increased cloud point, and thus, an increased HLB can be used in enhanced oil recovery processes as described herein. Such nonionic, non-emulsifying surfactants can be non-emulsifying since the increased temperature of the reservoir formation can destabilize emulsions formed of water and oil. Thus, although the nonionic, non-emulsifying surfactant has an increased HLB, the nonionic, non-emulsifying surfactant can also be non-emulsifying when used in reservoir formations with increased temperatures.

As discussed herein, the compositions for use in enhanced oil recovery of the present disclosure include water, the nonionic, non-emulsifying surfactant and carbon dioxide. Carbon dioxide is a noncondensable gas (e.g., a gas that is not easily condensed by cooling). As appreciated by one skilled in the art, for a given crude oil temperature, the noncondensable gas can become miscible with oil above a pressure known as the minimum miscibility pressure. As discussed herein, above this pressure, this "noncondensable" gas can attain a liquid phase or supercritical phase that has the characteristics of both gases and liquids.

Although embodiments described herein include carbon dioxide as the noncondensable gas in compositions of the present disclosure, one skilled in the art will appreciate that other noncondensable gases may also be included in place of carbon dioxide and/or in addition to carbon dioxide. Examples of other possible noncondensable gases include, but are not limited to, nitrogen, natural gas, methane, propane, butane, ethane, ethylene, hydrogen sulfide, carbonyl sulfide, air, combustion flue gas, mixtures of methane with ethane, argon, light hydrocarbons, and mixtures thereof, among others.

With enhanced recovery processes which employ noncondensable gases under miscible conditions, as embodiments are described herein, the oil can be caused to flow toward a producing well because the noncondensable gas acts as a solvent, thus substantially dissolving, or "swelling" the oil (e.g., increases the volume of the oil by dissolving into the oil) to reduce the viscosity of the oil (e.g., provide a lowered viscosity of the oil). As used herein "dissolving" into the oil refers to the process where the carbon dioxide in the stable foam passes into solution with the oil. Since the carbon dioxide has a low viscosity relative to the oil, the viscosity of the oil will decrease as the carbon dioxide dissolves into the oil. In addition, as discussed herein, viscosity is a measure of a fluid's resistance to flow. Therefore, by allowing the carbon dioxide in the stable foam to dissolve into the oil in the reservoir formation to provide a lowered viscosity of the oil, the oil will flow more readily than if the carbon dioxide had not dissolved into the oil. By reducing the viscosity, the oil can flow into a production well linked to the reservoir formation for recovery of the oil.

Carbon dioxide can be included in embodiments of the present disclosure at a lower limit of about 10 volume percent or greater, based on a total volume of the water and carbon dioxide. In an additional embodiment, carbon dioxide can be included at a lower limit of about 60 volume percent or greater, based on a total volume of the water and carbon dioxide. Carbon dioxide can also be included in embodiments of the present disclosure at an upper limit of about 95 volume percent or less, based on a total volume of the water and carbon dioxide. In an additional embodiment, carbon dioxide can be included at an upper limit of about 90 volume percent or greater, based on a total volume of the water and carbon dioxide. Embodiments also include carbon dioxide in a range combining one of the lower limit with one of the upper limit as listed herein with regard to carbon dioxide volume percentages.

As discussed herein, the term "water" as used with the composition of the present disclosure can be, for example, a brine. A brine is water saturated or with a high concentration of salt. A brine solution may contain as little as 0.2 weight percent salt, based on total weight of the brine solution, or the brine solution may contain salt up to the saturation concentration of salt, which may exceed 15 weight percent, based on total weight of the brine solution, depending on the temperature of the brine solution. Such salts can include sodium chloride, calcium chloride, and/or magnesium chloride, among others. In some embodiments, the brine can include from 2 to 10 weight percent sodium chloride, 0.5 weight percent calcium chloride, and 0.1 weight percent magnesium chloride in deionized water. Other brines are also possible.

In some embodiments, compositions of the present disclosure can include other additives. For example, the composition can include corrosion inhibitors, co-surfactants, scale inhibitors, mixtures thereof, as well as other additives. In some embodiments, the total amount of the additives added to the compositions of the present disclosure is not greater than about 5 weight percent, based on a total weight of the composition.

Embodiments of the present disclosure can also include a method for recovering oil from a reservoir formation penetrated by at least one injection well and one production well containing water and oil. The method embodiment of the present disclosure can be termed a gas flooding process, as discussed herein. Since gas flooding processes are typically a tertiary recovery process performed after water flooding, the hydrocarbons left in the reservoir formation tend to be in hard to reach areas. Also, most of the reservoir formation is filled with water from a water flooding procedure. As such, embodiments of the present disclosure include selecting a non-emulsifying, nonionic surfactant of the present disclosure, and injecting the nonionic, non-emulsifying surfactant with carbon dioxide and water into the reservoir formation via the injection well to form a stable foam formed of carbon dioxide and water in the reservoir formation, as discussed herein.

In some embodiments, the nonionic, non-emulsifying surfactant can have an HLB less than about 14. In various embodiments, the nonionic, non-emulsifying surfactant has an HLB of at least about 14 and a cloud point, where selecting the non-emulsifying, nonionic surfactant of the present disclosure can include selecting the surfactant with a cloud point in a range of about the temperature of the reservoir formation to about 30° C. above a temperature of the reservoir formation in which the composition is to be used. In some embodiments, selecting the non-emulsifying, nonionic surfactant of the present disclosure includes selecting the surfactant with a cloud point in a range of about 10 to about 20° C. above the temperature of the reservoir formation in which the composition is to be used.

In some embodiments, the nonionic, non-emulsifying surfactant can be injected with carbon dioxide into the reservoir formation, where the reservoir formation contains water. However, in various embodiments, the nonionic, non-emulsifying surfactant can be injected into the reservoir with water, and then carbon dioxide can be injected into the reservoir. In addition, in some embodiments, the nonionic, non-emulsifying surfactant can be injected into the reservoir with both water and carbon dioxide, where the nonionic, non-emulsifying surfactant can be included in either the carbon dioxide and/or the water.

The purpose of the foam formed can be to inhibit the flow of the carbon dioxide into that portion of the reservoir formation containing only residual oil. In other words, the foam can block the flow of carbon dioxide into portions of the reservoir formation where oil has been recovered using previously performed recovery processes. Therefore, the foam forces the carbon dioxide to drive the recoverable hydrocarbons from the less depleted portions of the reservoir formation toward the production well.

There are several ways of generating foam. For example, foam can be made before being injected into the reservoir formation by stirring water and the nonionic, non-emulsifying surfactant and injecting it into the reservoir. In addition, the nonionic, non-emulsifying surfactant can be introduced into the field with water, and a noncondensable gas can be injected behind the nonionic, non-emulsifying surfactant, termed a surfactant-alternating-gas (SAG) process. Once the noncondensable gas hits the nonionic, non-emulsifying surfactant in the reservoir formation, the shearing forces can create foam in the reservoir formation. Other methods of forming foam within a reservoir formation are described in U.S. Pat. No. 4,380,266, which is incorporated herein by reference.

As discussed herein, since typically the gas flooding process follows a water injection process, the reservoir formation already contains water when the methods of the present disclosure are begun. As such, the nonionic, non-emulsifying surfactant can migrate to the interface of carbon dioxide and water to form foam when the carbon dioxide with surfactant is injected into the reservoir. However, the ratio of carbon dioxide to water can be greater than 95:1 near the wellbore, or injection well opening, therefore foam does not tend to form at the wellbore. Rather, the nonionic, non-emulsifying surfactant and carbon dioxide can flow further into the reservoir formation before enough water is encountered for the foam formation of carbon dioxide and water. As one skilled in the art will appreciate, the carbon dioxide with surfactant can be injected into the reservoir formation in a number of ways.

As discussed herein, the method includes allowing the carbon dioxide in the stable foam to dissolve into the oil in the reservoir formation to provide a lowered viscosity of the oil, and pumping the oil having the lowered viscosity from the reservoir. As discussed herein, the surfactant selected is non-emulsifying; therefore the nonionic, non-emulsifying surfactant does not encourage the formation of emulsions formed of water and oil. Thus, an emulsion formed of water and oil that may form in the method step of pumping the water and oil from the reservoir formation to the earth surface is more likely to break, facilitating the recovery of oil without further use of emulsion breaking techniques, such as those as described in U.S. Pat. No. 4,374,734, which is incorporated herein by reference.

It is to be understood that the above description has been made in an illustrative fashion, and not a restrictive one. Although specific embodiments have been illustrated and described herein, those of ordinary skill in the art will appreciate that other component arrangements can be substituted for the specific embodiments shown. The claims are intended to cover such adaptations or variations of various embodiments of the disclosure, except to the extent limited by the prior art.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the disclosure.

Embodiments of the present disclosure are illustrated by the following examples. It is to be understood that the particular examples, materials, amounts, and procedures are to be interpreted broadly in accordance with the scope and spirit of the disclosure as set forth herein.

EXAMPLES

The following examples are given to illustrate, but not limit, the scope of this disclosure. Unless otherwise indicated, all parts and percentages are by weight. Weight percent is the percentage of one compound included in a total mixture, based on weight. The weight percent can be determined by dividing the weight of one component by the total weight of the mixture and then multiplying by 100. Unless otherwise specified, all instruments and chemicals used are commercially available.

Materials

Sodium chloride (GR crystals) from EM Science is used as received. Decane (certified n-decane), magnesium chloride (hexahydrate, enzyme grade), and calcium chloride (certified ACS dihydrate) are used as received from Fisher Scientific.

Deionized (DI) water is used throughout from a Nanopure™ II (Barnstead, Dubuque, Iowa) with an average conductance of 16 ohms.

2-ethylhexanol available from Sigma-Aldrich®, St. Louis, Mo.

Potassium hydroxide available from Sigma-Aldrich®, St. Louis, Mo.

Brine solutions are made including from about 2 to about 10 percent by weight NaCl, 0.5 percent by weight calcium chloride ($CaCl_2$), and 0.1 percent by weight magnesium chloride ($MgCl_2$) in DI water. Surfactants are obtained from commercial sources or synthesized as described below.

Surfactant Synthesis

The following procedure exemplifies a standard procedure for making a surfactant solution using alkoxylation, as one skilled in the art will appreciate. A similar procedure can be used for making other surfactant solutions used in the following examples. In addition, one skilled in the art will appreciate that this is an exemplary procedure and that other components can be substituted into the procedure to make a similar surfactant solution. For example, the following example includes a catalyzation step with solid potassium hydroxide (KOH).

Alkoxylation of 2-Ethylhexanol (4.5PO-8EO)

About 846 grams (g) of 2-ethylhexanol is catalyzed with about 2.98 grams of solid potassium hydroxide (KOH) and dehydrated under 30 millimeters of mercury (mm Hg)/Nitrogen at about 100 degrees Celsius (° C.) for about 30 minutes. This material is then propoxylated by pumping about 1,780 g propylene oxide (PO) into a reactor at a temperature of about 130° C. The reaction is allowed to continue at about 130° C. until the PO has reacted. This material is then ethoxylated by pumping about 2,140 g ethylene oxide (EO) into the reactor. After complete reaction, measured by when the pressure inside the reactor reaches ambient pressure, the mixture is neutralized at about 70° C. by treating with magnesium silicate or neutralized with acetic acid.

Example 1

Figure 1:
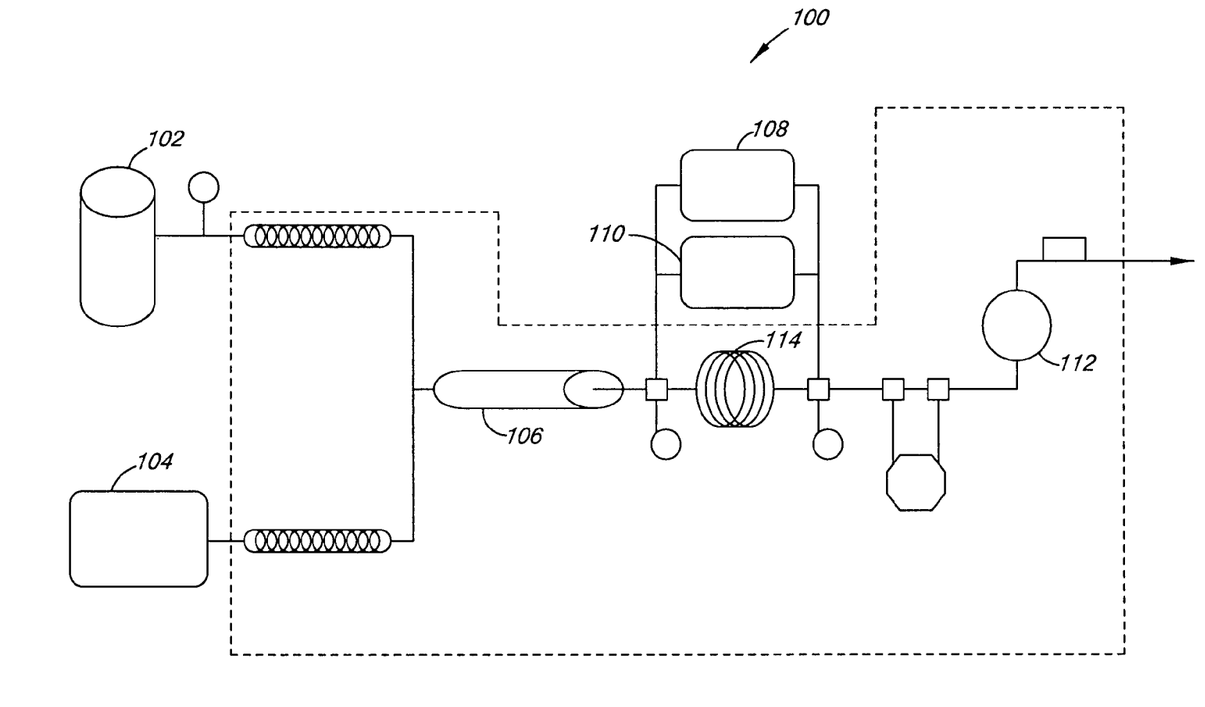
FIG. 1 illustrates an embodiment of the apparatus used to measure foam viscosity according to the present disclosure, as described in Example 1.

In this Example, apparent viscosity is determined for various nonionic, non-emulsifying surfactants. The apparatus 100 to measure foam viscosity is depicted in FIG. 1. Before beginning, the system is equilibrated to 40° C. Carbon dioxide and a surfactant solution are pumped simultaneously into the system at a volumetric ratio of 9:1 $CO_2$:surfactant solution through two pumps 102 and 104, where the carbon dioxide is pumped through pump 102 and the surfactant solution is pumped using pump 104. The mixture of carbon dioxide and surfactant solution are maintained at a total volumetric flow rate of 4 milliliters per minute (ml/min). The foam is generated by passing the mixture through a 4 inch (in)×0.152 in sand pack 106 containing 20-40 mesh sand which has been pre-equilibrated with surfactant.

The foam generated in the sand pack flows through a capillary tube (0.03 in internal diameter (ID), 195 centimeters (cm) in length). The differential pressure across the capillary tube is measured by either a differential pressure meter (Validyne, Model CD23) with a 100 pounds per square inch absolute (psia) diaphragm 108, or a differential pressure meter with a 20 psia diaphragm 110. An average ΔP value is obtained with a pressure transducer placed on the apparatus 100 on either diaphragm in use 108, 110. As foam forms, the pressure inside the capillary can oscillate. When the average value recorded on the transducer every 2 minutes varies by less than about 15 percent, the apparatus has reached steady state.

The presence of foam is then verified visually using a view cell 112 after the foam exits the capillary tube 114. The pressure of the system is maintained near 2,000 psi by means of a back pressure regulator. The actual value during each run is recorded in the table.

The apparent viscosity of each foam is calculated from the ΔP by use of the following equation:

$$\eta_{apparent} = \frac{\tau}{\dot{\gamma}} = \frac{\left(\frac{\Delta P \cdot R}{L}\right)}{\left(\frac{U}{R}\right)} \lambda = \frac{\lambda R^2 \Delta P}{LU}$$

where the factoring term, λ, is set to 0.5 and R describes the radius of the capillary tube, ΔP is the measured pressure drop, L is the length of the capillary tube, and U is the velocity of the foam.

The $CO_2$-philicity is defined, as discussed herein, as the negative difference in chemical potential of the surfactant hydrophobic group in carbon dioxide (μCT) and the surfactant hydrophobic group chemical potential in its pure liquid form (μTT). The chemical potential of the surfactant as well as its hydrophobic, hydrophilic groups are computed using COSMOtherm software package (available from COSMOlogic GmbH & Co. KG, Leverkusen, Germany). COSMOtherm program uses the COSMO (Conductor like screening model) theory of molecular electrostatic charge surface interaction to compute the thermo physical property of any molecule in its pure liquid form of any other solvent from its molecular structure.

Isolated molecular structures of organic and/or inorganic molecules, macromolecules, organometallic complexes, radicals, ions, and transition states, among others, can routinely be obtained using quantum chemistry methodology. The Gaussian suite of packages is used to obtain the isolated structure of the surfactants. In addition, the semi-empirical AM1 methodology is used to obtain the optimized isolated structure of the surfactants. The initial guess of each structure is obtained using the same procedure, to remove any bias in the choice of conformer. Also, smile line notation is used to define the surfactant and CORINA (available from Molecular Networks GmbH—Computerchemie, Erlangen, Germany) smiles to 3D program is used to obtain the starting geometry of all the surfactants.

COSMOtherm recommends BP/TZVP energy, and COSMO calculation is done on all the nonionic, non-emulsifying surfactant structures using Turbomole program. The COMSO and energy file of each surfactant is used in the COSMOtherm program to compute the desired chemical potential. The surfactant COSMO meta file option is used to compute the chemical potential of the hydrophobic end of the surfactant. The COSMO meta option treats a molecule as a string of atoms and each atom in the string has an atomic weight factor of 1. By changing the atomic weight factor in the COSMO meta file, the molecule can be cropped and repeated to create macromolecules, for example. In this case, the atomic weight factor of the hydrophilic/hydrophobic region of the surfactant is zeroed out to represent only the hydrophobic/hydrophilic part of the surfactant. The COSMO and energy file of each surfactant and their corresponding COSMO meta file description for the hydrophobic end group is used in the COSMOtherm program to compute the desired chemical potential of the hydrophobic end group of the surfactant. The chemical potential of the surfactant and its hydrophobic tail end is then computed in a carbon dioxide solvent.

The results of the experiments are shown in Table 1. As shown in Table 1, the nonionic, non-emulsifying surfactants of the present disclosure are represented to clearly show the structures of each. For example, 2-octanol-9PO-9EO shown in Table 1 can also be described as $(C_8H_{17}O)$—$(C_3H_6O)_9$—$(C_2H_4O)_9$—H, which accords with the general formula provided herein for the nonionic, non-emulsifying surfactant. For the example, 2-octanol corresponds to "RO", 9PO corresponds to —$(CR^1R^2CR^3R^4O)_x$—, and 9EO corresponds to —$(C_2H_4O)_y$. The concept can be also be applied to the other nonionic, non-emulsifying surfactants listed in Table 1.

TABLE 1

| | Surfactant | T °C. | Apparent Viscosity, cP | Cloud Point °C. | HLB | $CO_2$-philicity |
|---|---|---|---|---|---|---|
| Example 1 | 2-octanol-9PO-9EO | 40 | 98 | 45 | 11 | 3.59 |
| Example 2 | 2-ethyl-1-hexanol-5PO-8EO | 40 | 69 | 52 | 12 | 2.08 |
| Example 3 | 2-ethyl-1-hexanol-12PO-11EO | 24 | 121 | 39 | 11 | 4.15 |
| Example 4 | 2-ethyl-1-hexanol-5PO-9EO | 40 | 132 | 61 | 12 | 2.08 |
| Example 5 | 2-ethyl-1-hexanol-5PO-11EO | 40 | 72 | 68 | 13 | 2.12 |
| Example 6 | 2-ethyl-1-hexanol-5PO-13EO | 40 | 85 | 79 | 14 | 2.15 |
| Example 7 | 2-ethyl-1-hexanol-5PO-15EO | 40 | 103 | 88 | 15 | 2.59 |
| Example 8 | C9 alcohols-3.5PO-8EO (branched) | 40 | 61 | 58 | 12 | 1.96 |
| Example 9 | C9 alcohols-4PO-8EO (highly branched) | 40 | 100 | 56 | 12 | 1.81 |
| Example 10 | C11 alcohols-2PO-7EO (branched) | 40 | 57 | 50 | 11 | 1.67 |
| Example 11 | 1-hexanol-5PO-9EO | 40 | 57 | 52 | 13 | 1.81 |
| Example 12 | 1-hexanol-5PO-11EO | 40 | 71 | 64 | 14 | 2.02 |
| Example 13 | 1-hexanol-5PO-13EO | 40 | 107 | 74 | 15 | 1.85 |

TABLE 1-continued

|  | Surfactant | T °C. | Apparent Viscosity, cP | Cloud Point °C. | HLB | $CO_2$-philicity |
|---|---|---|---|---|---|---|
| Example 14 | 1-hexanol-5PO-15EO | 40 | 97 | 84 | 16 | 1.82 |
| Example 15 | 1-Hexanol-Octene Oxide-12EO | 40 | 101 | 75 | 12 | * |
| Comp. Example 1 | Tergitol 15-S-20 | 40 | 78 | >100 | 16 | 1.12 |
| Comp. Example 2 | Tergitol 15-S-7 | 24 | 34 | 37 | 12 | 1.1 |
| Comp. Example 3 | Tergitol TMN-6 | 24 | X | 36 | 13 | 1.12 |
| Comp. Example 4 | C12-C14 alcohol blend-7EO | 24 | X | 52 | 11 | 0.9 |
| Comp. Example 5 | lauric acid-12EO | 24 | X | 56 | 13 | 1.18 |
| Comp. Example 6 | Lutensol XP-70 | 40 | 5 | 58 | 12 | 1.13 |
| Comp. Example 7 | tridecylalcohol 1.5PO 6EO (branched) | 24 | 19 | 34 | 10 | 1.53 |
| Comp. Example 8 | Ecosurf SA-9 | 40 | 8 | 60 | 11 | 1.55 |
| Comp. Example 9 | 2-ethylhexanol 5EO | 24 | 12 | <24 | 12 | 0.65 |
| Comp. Example 10 | 2-ethylhexanol 11.8EO | 40 | 41 | >80 | 15 | 0.62 |
| Comp. Example 11 | 1-octanol 4.5 PO 8 EO | 24 | 8 | 58 | 12 | 1.58 |
| Comp. Example 12 | 1-octanol 4.5PO 12EO | 24 | X | 59 | 14 | 1.68 |
| Comp. Example 13 | Tergitol NP-9 | 40 | 23 | 54 | 13 | 1.73 |

* Not calculated due to presence of higher alkene oxide.
X means no foam formed.

As can be seen from Table 1, surfactants with branched hydrophobes greater than 11 carbons (Tergitol 15-S-7, lauric acid-12EO and Tergitol TMN 6) have large tail-tail interactions leading to low $CO_2$-philicities. The low $CO_2$-philicity of these surfactants shows that surfactants with a hydrophobe portion with greater than 9 carbons has large tail-tail interactions that affect the $CO_2$-philicity. In addition, it shows that the $CO_2$-philicity is highly dependent on the tail-tail interactions of the surfactant structures since the $CO_2$-philicity increases or decreases based on the tail-tail interactions.

As can be seen from Table 1, these surfactants (Tergitol 15-S-7, lauric acid-12EO, and Tergitol TMN 6) do not create stable foam except when enough EO is added to give the surfactant an HLB of around 15-16, as in the case of Tergitol 15-S-20. However, having an HLB of greater than 14 does not insure the ability to create foam as is observed with 2-ethylhexanol-11.8EO. Unfortunately surfactants with HLBs greater than 14 are known to create stable oil water emulsions, and can be classified as emulsifying surfactants, as discussed herein. Such surfactants with HLBs greater than 14 are not suitable for the present disclosure (except at elevated temperatures as described herein) since the formation of stable emulsions of oil and water is sought to be prevented, as discussed herein.

When the branched hydrophobe length is decreased to 11 carbons or less and a linker of at least 2 propylene oxides is added (e.g., bottom 10 examples) the tail-tail interactions are decreased and the $CO_2$-philicity increases. These surfactants create foam independent of HLB. Two series of surfactants (e.g., 2-EH-5PO-(EO)y and 1-Hexanol-5PO-(EO)y with HLBs ranging from 12-15 and 13-16 respectfully are both capable of creating a stable foam across the entire range of HLBs. The useful range of $CO_2$-philicity is found to be from about 1.2 to about 5.0.

As can be seen from Table 1 surfactants with linear hydrophobes greater than 6 carbons (Ecosurf SA-9,1-octanol-4.5PO-8EO, and 1-octanol-4.5PO-12EO) have larger tail-tail interactions than branched hydrophobes regardless of PO content leading to low $CO_2$-philicities.

Example 2

In this Example, surfactants are mixed with a brine in order to determine the time to break an oil-brine emulsification. A 0.016 weight percent, based on total solution weight, surfactant is mixed in a large glass test tube with 60 ml of brine consisting of 2 weight percent NaCl, 0.5 percent $CaCl_2$, and 0.1 percent $MgCl_2$ in deionized water. Solid surfactants are melted at 50° C. prior to addition to the brine. Next, 3 ml of an oil, n-decane, is added to the brine, where the n-decane creates an oil layer on top of the aqueous layer.

The test tubes are heated to 40° C. and equilibrated. The test tubes are hand-shaken for 5 seconds each after which they are timed. The emulsified oil creams to the top of the test tube over time. When a clear layer is visible at the top of the white emulsion due to breaking of the oil-in-brine emulsion, the time is noted. In addition, the time is observed when the emulsion is broken into a clear oil layer and a clear brine layer. The results are shown in Table 2.

TABLE 2

| Surfactant | HLB | Time to break |
|---|---|---|
| Comp. Example 1 | 16 | >90 hours |
| Example 7 | 15 | 20 hours |
| Example 4 | 12 | 50 minutes |

As can be seen from Table 2, the Tergitol 15-S-20, which is a secondary alcohol ethoxylate containing 20 moles of ethylene oxide is ideal for creating stable emulsions of oil and water, thus, a surfactant with a hydrophobe (e.g., ethylene oxide) of 10-14 carbons and high HLB is an undesirable emulsifying surfactant. Decreasing the hydrophobe length (e.g., 2-EH-5-PO-15EO) decreases the stability of the oil-water emulsion, therefore leading the non-emulsifying surfactants. In addition, decreasing the hydrophobe length and the HLB (e.g., 2EH-5PO-9EO) creates the most unstable oil-water emulsions, and are also non-emulsifying.

Example 3

In this example, apparent viscosity is determined for various surfactants as the temperature of the surfactants is increased. This example uses the same procedure and set as described in Example 1 and FIG. 1. Also of note is that since the pressure is not increasing as the temperature is increased, the density of the $CO_2$ decreases as the temperature increases, making it more difficult to create foam. The results of the experiments are shown in Table 3.

TABLE 3

| Temperature | Example 4 (2-ethyl-1-hexanol-5PO-9EO) | Example 5 (2-ethyl-1-hexanol-5PO-11EO) | Example 6 (2-ethyl-1-hexanol-5PO-13EO) | Example 7 (2-ethyl-1-hexanol-5PO-15EO) |
|---|---|---|---|---|
| 24° C. | 136 cp | 182 cp | 114 cp | 135 cp |
| 40° C. | 132 cp | 72 cp | 85 cp | 103 cp |
| 60° C. | No Foam | 60 cp | 54 cp | 64 cp |
| 70° C. | No Foam | No Foam | No Foam | 63 cp |
| Cloud Point | 61° C. | 68° C. | 79° C. | 88° C. |

As can be seen from Table 3, increasing the hydrophilic group, (e.g., the poly(ethylene oxide) constituent), increases the temperature at which foam can form. For example, 2-ethyl-1-hexanol-5PO-15EO forms a foam at 70 degrees Celsius, while 2-ethyl-1-hexanol-5PO-9EO, 2-ethyl-1-hexanol-5PO-11EO, and 2-ethyl-1-hexanol-5PO-13EO do not. Therefore, by increasing the EO length, and consequently the cloud point, the surfactant retains the ability to create foam at higher temperatures.

What is claimed:

1. A nonionic, non-emulsifying surfactant composition comprising:

a nonionic, non-emulsifying surfactant of the formula:

$$RO-(CR^1R^2CR^3R^4O)_x(C_2H_4O)_y-H$$

where

R is selected from the group of branched alkyl, cyclic alkyl, and alkaryl groups having 3 to 11 carbon atoms;

$R^1$, $R^2$, $R^3$, and $R^4$ are each independently selected from the group of H, branched alkyl, linear alkyl, cyclic alkyl, or alkaryl groups having 1 to 6 carbon atoms; with the proviso that one or more of the following apply: that $R^1$, $R^2$, $R^3$, and $R^4$ cannot all be H, the sum of carbon atoms in $R^1+R^2+R^3+R^4$ is less than or equal to 8;

x is from 1.5 to 11 inclusive when the sum of carbon atoms in $R^1+R^2+R^3+R^4$ is equal to 1;

x is an integer from 1 to 2 inclusive when the sum of carbon atoms in $R^1+R^2+R^3+R^4$ is equal to 2 to 8; and y is an integer from 6 to 25 inclusive;

carbon dioxide in a liquid or supercritical phase; and water.

2. The nonionic, non-emulsifying surfactant composition of claim 1, where the nonionic, non-emulsifying surfactant has a $CO_2$-philicity in a range of about 1.5 to about 5.0.

3. The nonionic, non-emulsifying surfactant composition of claim 1, where the nonionic, non-emulsifying surfactant is selected from the group consisting of $(C_8H_{17}O)-(C_3H_6O)_5-(C_2H_4O)_9-H$, $(C_8H_{17}O)-(C_3H_6O)_5-(C_2H_4O)_{11}-H$, $(C_8H_{17}O)-(C_3H_6O)_9-(C_2H_4O)_9-H$, $(C_6H_{13}O)-(C_3H_6O)_5-(C_2H_4O)_{11}-H$, $(C_6H_{13}O)-(C_3H_6O)_5-(C_2H_4O)_{13}-H$, $(C_9H_{19}O)-(C_3H_6O)_4-(C_2H_4O)_8-H$, and mixtures thereof.

4. The nonionic, non-emulsifying surfactant composition of claim 1, where the nonionic, non-emulsifying surfactant has a hydrophilic-lipophilic balance (HLB) of less than about 14.

5. The nonionic, non-emulsifying surfactant composition of claim 1, where the nonionic, non-emulsifying surfactant has a cloud point that is from a temperature of a reservoir formation to about 30 degrees Celsius above the temperature of the reservoir formation in which the surfactant is to be used.

6. The nonionic, non-emulsifying surfactant composition of claim 1, where the nonionic, non-emulsifying surfactant composition is an enhanced oil recovery composition.

7. The nonionic, non-emulsifying surfactant composition of claim 6, where the nonionic, non-emulsifying surfactant promotes formation of a stable foam formed of carbon dioxide and water.

8. The nonionic, non-emulsifying surfactant composition of claim 1, where the nonionic, non-emulsifying surfactant has a HLB of at least about 14 and a cloud point, and the composition is utilizable in reservoir formations where a temperature of the reservoir formation is in a range of about the cloud point of the nonionic, non-emulsifying surfactant to about 30 degrees Celsius below the cloud point.

9. The nonionic, non-emulsifying surfactant composition of claim 8, where the temperature of the reservoir formation is in a range of about 10 to about 20 degrees Celsius below the cloud point.

* * * * *